Figure 4:
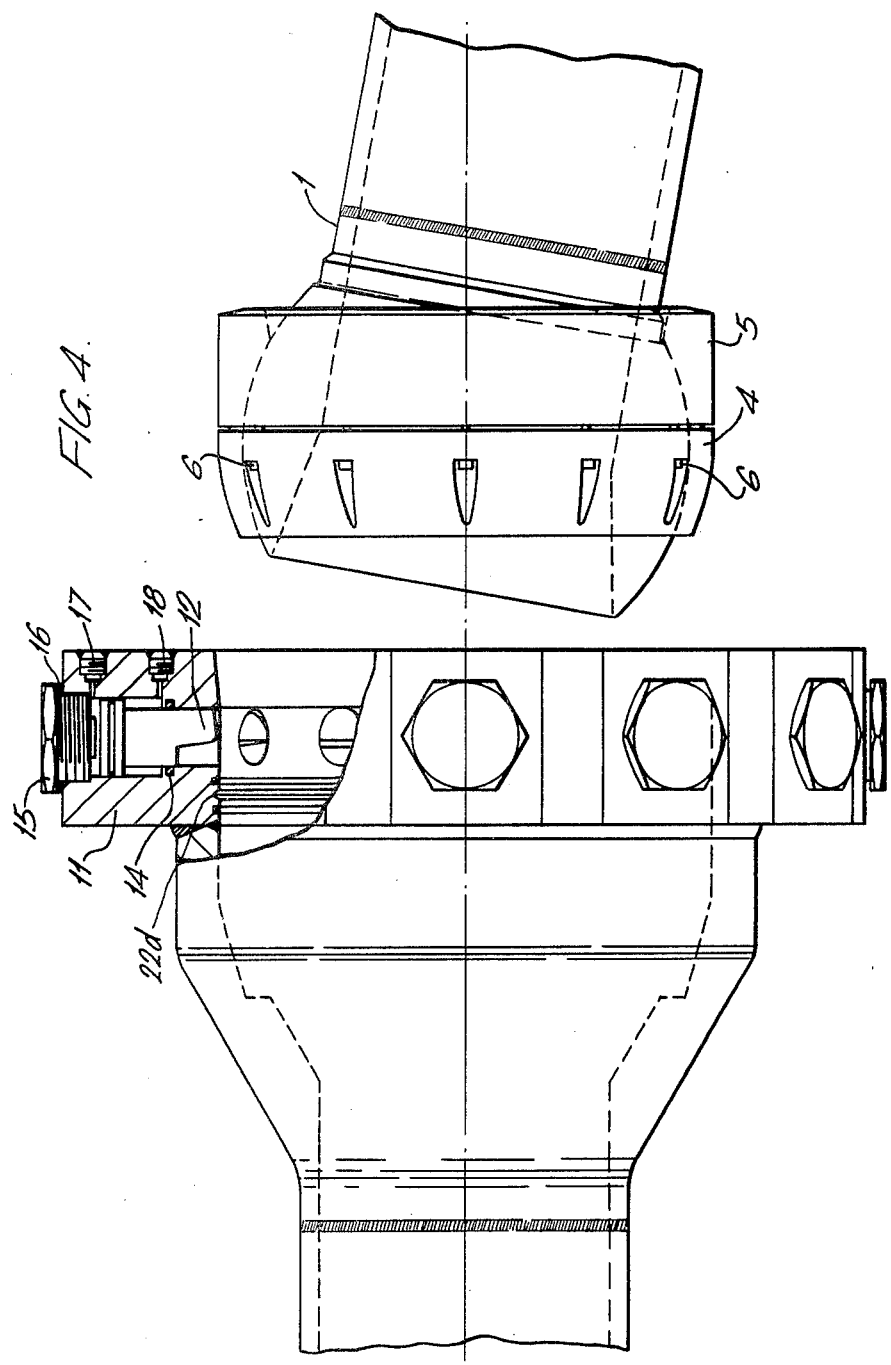

United States Patent [19]

Shotbolt

[11] 4,139,221
[45] Feb. 13, 1979

[54] BALL AND SOCKET JOINT

[76] Inventor: Keith Shotbolt, 62, Howards Wood Dr., Gerrards Cross, Bucks, England, SL9 7HW

[21] Appl. No.: 725,632

[22] Filed: Sep. 22, 1976

[30] Foreign Application Priority Data

| Oct. 6, 1975 | [GB] | United Kingdom | 40755/75 |
| Nov. 20, 1975 | [GB] | United Kingdom | 47754/75 |
| Feb. 6, 1976 | [GB] | United Kingdom | 04670/76 |
| Mar. 19, 1976 | [GB] | United Kingdom | 11218/76 |
| Jul. 12, 1976 | [GB] | United Kingdom | 28933/76 |

[51] Int. Cl.² ............................. F16L 35/00
[52] U.S. Cl. ........................ 285/18; 285/261; 285/271; 285/DIG. 21
[58] Field of Search ............... 285/18, DIG. 21, 261, 285/262, 266, 267, 268, 269, 270, 271, 263, 166, 167, 24, 27, 379; 403/135, 136, 138, 140

[56] References Cited

U.S. PATENT DOCUMENTS

| 717,882 | 1/1903 | Mortin | 285/271 |
| 908,414 | 12/1908 | Mellin | 285/271 |
| 3,466,066 | 9/1969 | Dawson | 285/39 |
| 3,479,061 | 11/1969 | Smookler et al. | 285/271 X |
| 3,874,706 | 4/1975 | Arnold | 285/DIG. 21 |
| 4,012,060 | 3/1977 | Reneau | 285/267 |
| 4,014,567 | 3/1977 | Arnold et al. | 285/24 |
| 4,045,054 | 8/1977 | Arnold | 285/18 |

FOREIGN PATENT DOCUMENTS 177503 11/1906 Fed. Rep. of Germany .......... 285/261

Primary Examiner—Dave W. Arola
Attorney, Agent, or Firm—Haseltine, Lake & Waters

[57] ABSTRACT

A ball and socket joint comprising a member having forward facing and rear facing spherical surface portions, a collar engaged about the member and having internal surface portions mating with the spherical surface portions of the member, a socket into which is received the previously formed assembly comprising the member with the collar engaged thereabout, and securing means for securing the assembly in the socket. The ball and socket joint being constructible as a pipe coupling, particularly a pipe coupling for use in difficult working environments such as a deep subsea location, the securing means can be constructed for remote operation and can be constructed for applying to the assembly a continuous pre-load force tending to push the assembly into the socket. A pipeline laying method suited to laying underwater pipelines of length up to about 12,000 feet for which conventional methods such as by the use of a lay barge may be uneconomic, or for laying pipelines under ice floes, comprises using a relatively small surface or submarine vessel to lay pipes up to about 500 feet in length with the components of ball and socket pipe couplings previously assembled to the ends of each pipe, and then joining the coupling component at one end of each pipe, after the pipe has been laid, to the mating component at the free end of the previously laid pipe.

18 Claims, 17 Drawing Figures

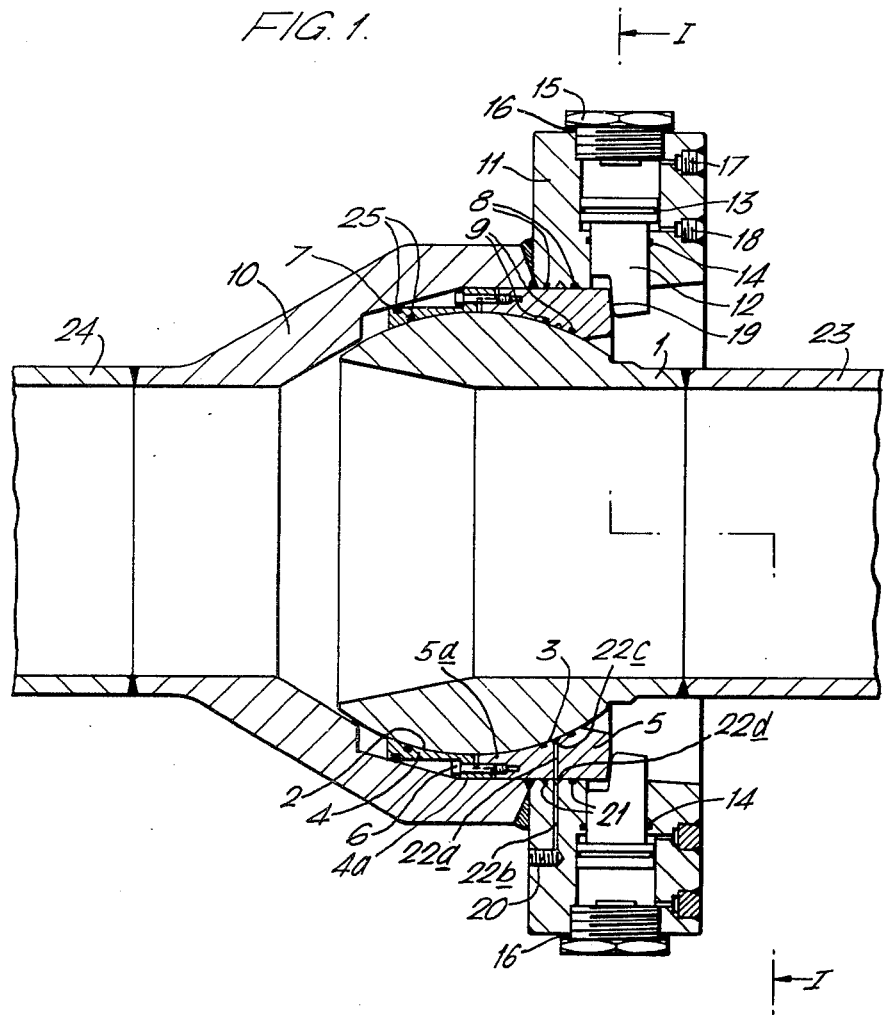

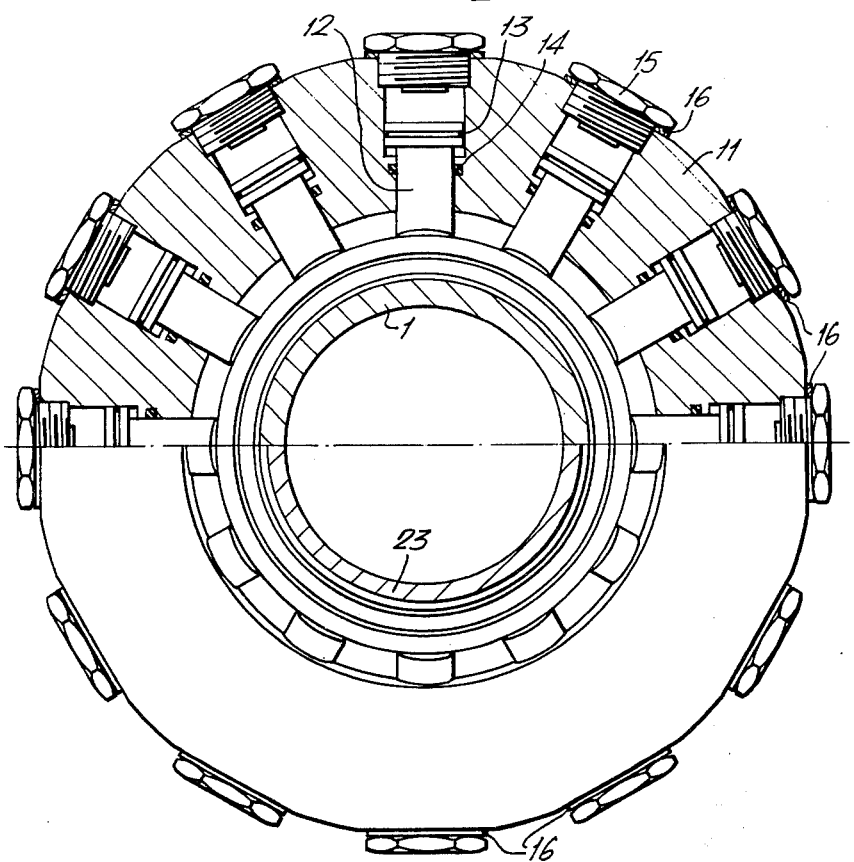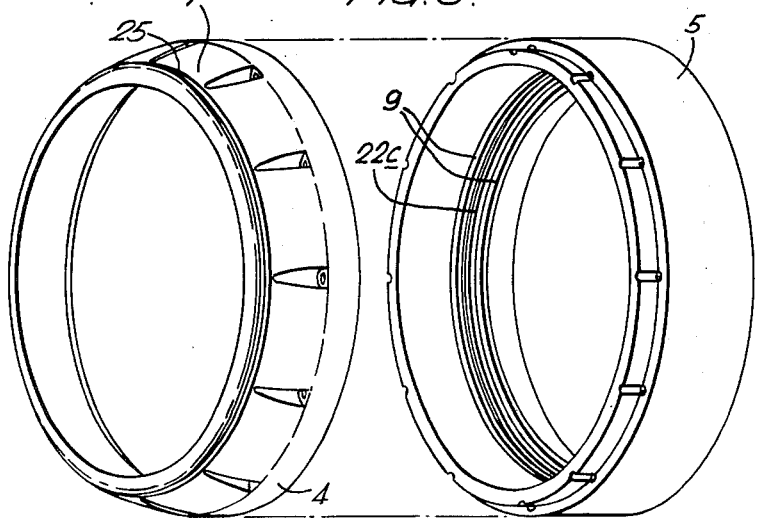

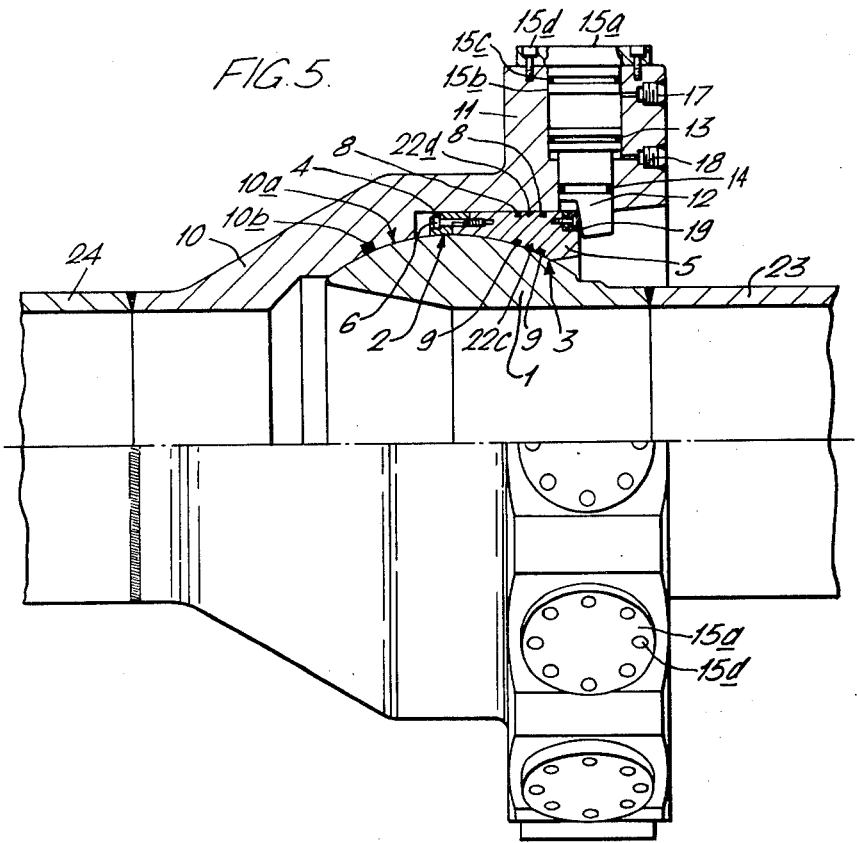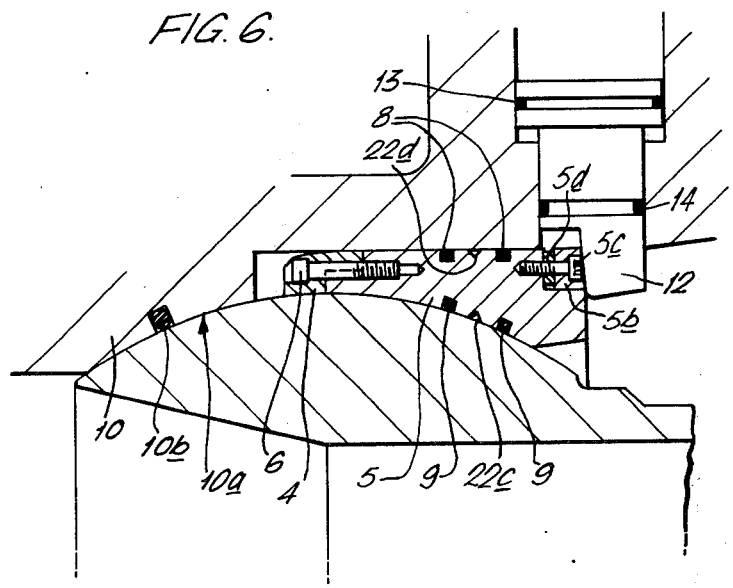

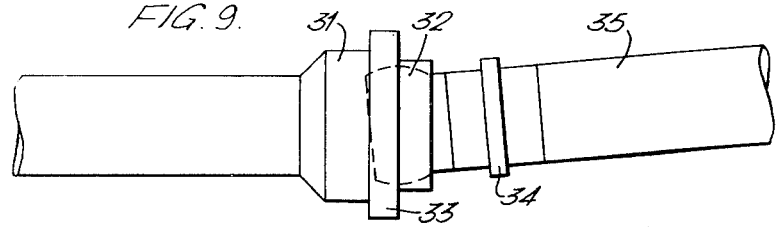
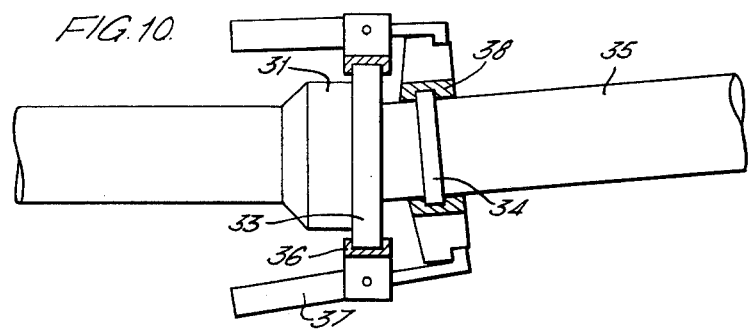
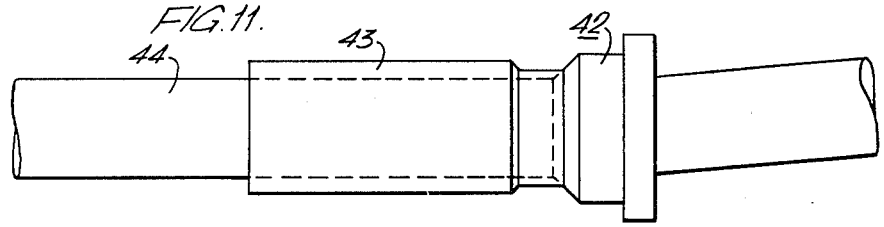
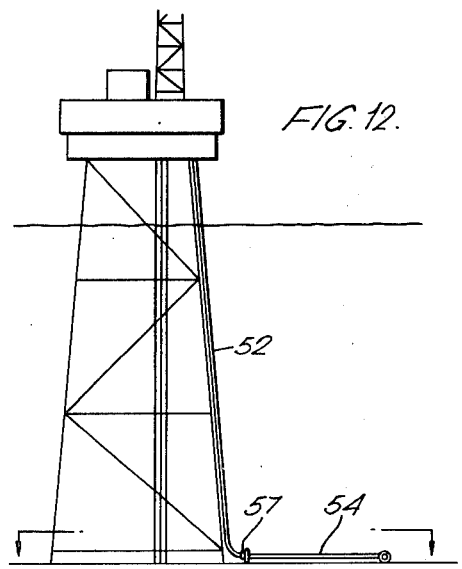
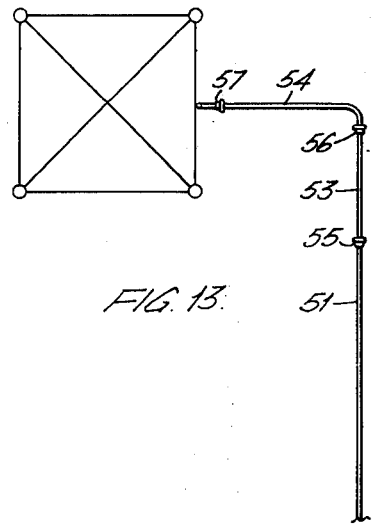

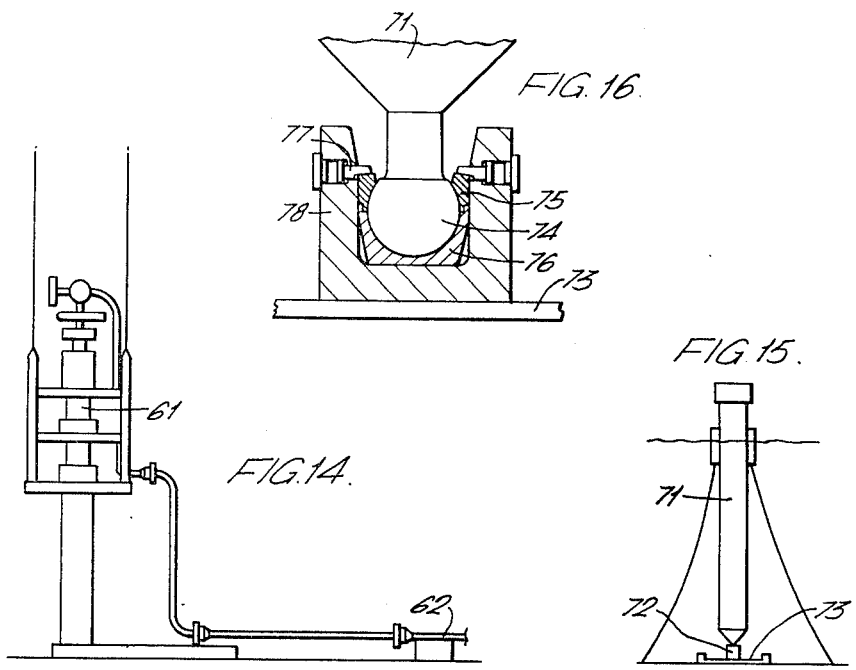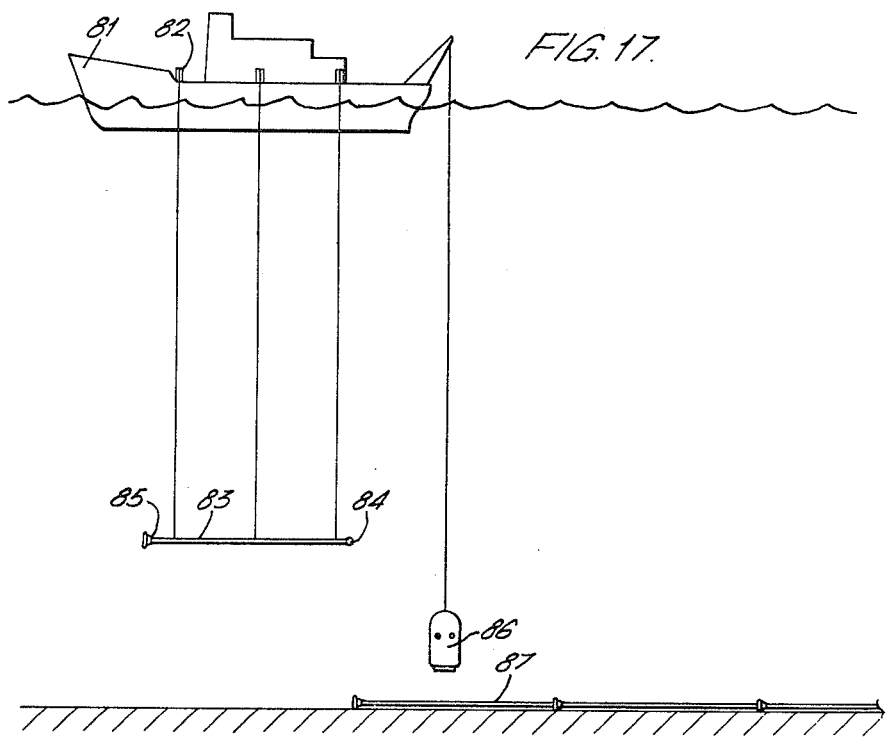

BALL AND SOCKET JOINT

This invention relates to ball and socket joints.

According to one aspect of the invention, there is provided an arrangement of parts forming an assembled ball and socket joint, comprising a member having a forward facing spherical surface portion on one side of a transverse plane passing through the member and a rear facing spherical surface portion on the other side of said plane, said spherical surface portions being annular and concentric, and a collar which is engaged about said member and which has a first spherical internal surface portion mating with said forward facing spherical surface portion of the member and a second spherical internal surface portion mating with said rear facing spherical surface portion of the member, the arrangement further comprising a socket wherein said collar and member have been received and securing means which is securing said collar and said member in the socket, said collar having been slidingly engaged about said member before it and the member were received within said socket so that, at that time, the member could swivel within the collar.

According to a second aspect of the invention, there is provided an arrangement of parts for being assembled to form a ball and socket joint, comprising a member having a forward facing spherical surface portion on one side of a transverse plane passing through the member and a rear facing spherical surface portion on the other side of said plane, said spherical surface portions being annular and concentric, and a collar which is slidingly engaged about said member and which has a first spherical internal surface portion mating with said forward facing spherical surface portion of the member and a second spherical internal surface portion mating with said rear facing spherical surface portion of the member so that the member can swivel within said collar, the arrangement further comprising a socket which has not received therein said collar and member but which is adapted for receiving therein the collar and member when the arrangement is assembled to form said ball and socket joint, and securing means which, when the ball and socket joint has been formed as aforesaid, is able to secure said collar and said member in said socket.

Preferably, said member and socket each comprise a through bore and are connectible to respective ones of two pipes to be coupled together so as to form a pipe coupling.

Said collar may comprise two ring-shaped parts one of which comprises said spherical internal surface portion mating with said forward facing spherical surface portion of the member and the other of which comprises said spherical internal surface portion mating with said rear facing spherical surface portion of the member. Said two ring-shaped parts may be such that, when the collar and member are or have been received in the socket, the application to said collar of a force which tends to push the collar forwardly into the socket causes said two ring-shaped parts to move towards one another to come into tighter engagement with said member and to clamp said member within said collar. Alternatively, the ball and socket joint may be such that, when the collar and member have been received in the socket, the application to said collar of a force which tends to push the collar forwardly into the socket clamps said member between said second spherical internal surface portion of the collar and a spherical internal surface of the socket.

Preferably, the arrangement includes means for locating the relative position of one of said ring-shaped parts with respect to the other in a plane perpendicular to the axis of the collar. For example, said locating means can comprise an annular, axially projecting portion of the inner end of one of said ring-shaped parts, the inner end of the other ring-shaped part being engaged within said projecting portion with a transition fit therebetween. Alternatively, said two ring-shaped parts can be connected together by a plurality of screws engaged within respective bores distributed around the collar axis, at least two of the screws having a transition fit within their respective bores.

Advantageously, the axial length of the collar is adjustable. For example, said collar can comprise a main body and an annulus which is connected to the rear of the main body to form the rear surface of the collar, the axial dimension of the annulus and/or its spacing from the main body being able to be selected thereby to adjust the axial length of the collar.

Advantageously, at least a portion of the collar adjoining the front thereof has an external surface which becomes smaller in diameter proceeding towards the front of the collar. Said external surface may be frusto-conical. Between said portion of the collar adjoining the front thereof and a rear portion of the collar, there is preferably an intermediate portion having an external surface of which the diameter at its forward end is equal to the diameter of the adjacent end of the said portion of the collar adjoining the front of the collar, and which, proceeding towards the rear of the collar, smoothly increases in diameter such that each side of an axially extending cross-section through the intermediate portion comprises a curve, which curve is tangential to the external surface of the forward end of said rear portion of the collar. The external surface of a portion of the collar adjoining the rear of the collar can be cylindrical, or it may smoothly increase in diameter towards the rear of the collar.

The internal surface of said socket and a forward surface of said collar may be adapted for mating with one another or, alternatively, the internal surface of said socket and said forward spherical surface portion of the member may be adapted for mating with one another.

Preferably, the arrangement includes sealing means for forming a seal between the mating surfaces of said socket and said collar, and/or sealing means for forming a seal between the mating surfaces of said socket and said member, and/or sealing means for forming a seal between said collar and said member. By way of example, this sealing means may comprise one or more sealing rings made of resiliently deformable material.

It may possibly be advantageous if said spherical internal surface portions of said collar comprise material which is more easily deformable than the material of which the said member is made. Alternatively or in addition, it may be advantageous for the internal surface of said collar to be provided with annular teeth or to be roughened, for example by knurling.

Preferably, the arrangement includes flow enabling means for enabling fluid, for example excess grease, to flow out from between mating surface(s) between said collar and said member, and/or between said member and said socket, and/or between said collar and said socket. For example, said flow enabling means can comprise, in at least one of the or each pair of mating surfaces, a series of interconnected annular and axially extending grooves.

Said collar preferably has openings in it, for example it can have slots in it so that it is partly or wholly segmented, to reduce its resistance to expansion and hence make it easier for the collar to expand to take up clearance between the collar and the socket.

Advantageously said socket comprises an annular flange having dimensions which provide the flange with substantial strength in respect of radially directed forces tending to increase the diameter of the flange, and wherein the arrangement is such that, in use, a rear portion of said collar is surrounded by said flange, and the flange constrains expansion of the collar.

It is preferred that, when the ball and socket joint is in use, a separation force parallel to the axis of the collar and tending to move the said member and said socket away from each other so that the member tends to be pushed out of the socket is restrained by the member being in contact with the collar, by the collar being in contact with said securing means, and by the securing means being in contact with the socket, and that the points of contact between the member, the collar, the securing means and the socket are, at least at their nearest points to the axis of the collar, at a distance from said axis of the collar which is no greater than 20%, or even better 10%, more than one half the maximum transverse dimension of said member.

Preferably, the or each pair of said mating surfaces have a 32 micro-inch surface finish or better — even more preferably the surfaces can have a 16 mico-inch or 8 micro-inch surface finish or better.

Said securing means can be such as to engage a rear surface of said collar. Said securing means can comprise abutment means supported by said socket, and driving means, for example rotary screw means or fluid pressure operated means, for moving said abutment means between a first, disengaged, position in which it permits said collar and member to be received within said socket, and a second position in which said abutment means engages said collar and secures it and said member within said socket. For example, said abutment means can comprise a plurality of abutment members distributed around the circumference of said socket, and said drive means can be operable for moving the abutment members radially between respective first, disengaged positions in which the abutment members are radially outwards of the collar and respective second positions in which the abutment members engage said collar. Alternatively, said abutment means can comprise a ring which is divided at a position on its circumference so that it can be expanded and contracted between said first and second positions, the ring being mounted in a circumferential groove in the internal surface of said socket. Preferably, there are means for locking said abutment means in said second position.

As an alternative to the above, said socket and said collar can have respective annular flanges, and said securing means can comprise means for connecting said flanges together. Preferably, the flange of the collar and the collar itself are two separate members which are connected together by means which enables the collar to expand without substantial restriction on such expansion by the flange of the collar. By way of example, said securing means can then comprise a plurality of screws distributed around the circumference of said two flanges, or a segmented ring-shaped clamp having two annular walls which extend radially inwards towards the central axis of the clamp, the clamp segments being able to be drawn together by screw means so as to reduce the diameter of the clamp with said flanges between the said two annular walls.

Advantageously, said securing means is or was operable during assembly of the ball and socket joint for preloading said collar with a force which tends to push the collar forwardly into the socket. Then, where the securing means comprises the aforementioned abutment means, the latter can comprise a wedge arrangement which, as it is moved to said second position, engages a rear-facing surface of said collar and applies to said collar said force. Alternatively, where the aforementioned two screwed together flanges are provided, the parts can be dimensioned such that, when the collar and member are fully entered into said socket, said two flanges are spaced apart and said plurality of screws can then be tightened so as to apply said force to said collar, or the internal faces of said ring-shaped clamp walls and/or faces of said flanges in engagement with said walls can be so inclined that, as said segments are drawn together, said flanges are forced towards one another.

Preferably the wedging angle of the aforementioned wedge arrangement is such that the ratio of distance moved by the wedge means while the wedge surface thereof is in engagement with the collar to distance moved by the collar as a result of such movement of the wedge means is at least 2:1, or better still, at least 5:1, or even better, at least 10:1.

Advantageously, the arrangement includes respective radially projecting portions fixed with respect to the said socket and the said member and operable for being engaged with jacking means for the jacking means to draw the socket and the member with said collar engaged therearound towards each other so that said collar and member are entered into the socket.

According to a third aspect of the invention, there is provided an underwater pipeline comprising two lengths of pipe which are joined together by a ball and socket pipe coupling comprising an arrangement as described above.

According to a fourth aspect of the invention, there is provided a method of installing underwater pipelines the method comprising laying separate lengths of pipe each up to about 500 feet long, and joining them together on bottom by means of ball and socket pipe couplings which permit coupling of two lengths of misaligned pipe, the ball and socket of each coupling having been attached to the ends of the two pipe lengths to be coupled thereby before the two pipe lengths are submersed. Advantageously, said lengths of pipe are each between 100 and 200 feet long.

According to a fifth aspect of the invention, there is provided an underwater pipeline which has been installed by the method described above.

Figure 7:
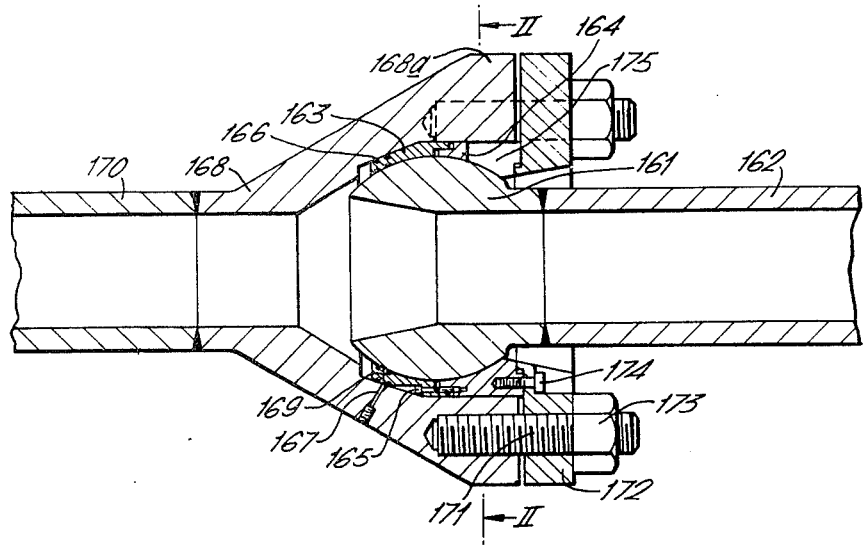
Figure 8:
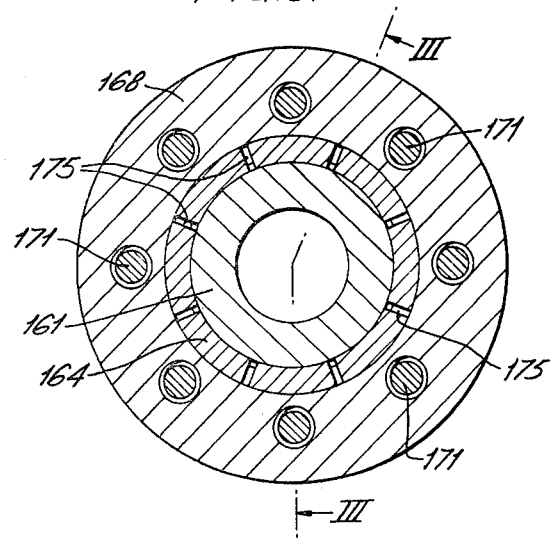

For a better understanding of the invention and to show how the same may be carried into effect, reference will now be made, by way of example, to the accompanying drawings, in which:

FIG. 1 is a longitudinal sectional elevation of one ball and socket pipe coupling according to the invention, FIG. 2 is a part sectional view on the line I—I in FIG. 1, FIG. 3 is a perspective view of the two parts of a collar used in the coupling of FIG. 1, FIG. 4 is a partly-sectioned elevation corresponding to FIG. 1 but showing the coupling in a partly disassembled condition, FIG. 5 is a partly-sectional elevation of a second ball and socket pipe coupling according to the invention, FIG. 6 is an enlarged view of part of the FIG. 5 coupling, FIG. 7 is a sectional view, on the line III—III of FIG. 8, of a third ball and socket pipe coupling, FIG. 8 is a section on the line II—II of FIG. 7, FIGS. 9 and 10 are diagrams illustrating a method of assembling a coupling according to the invention, FIG. 11 is a diagram of a pipeline which has been repaired using a coupling according to the invention, FIGS. 12 and 13 are an elevation and a plan respectively of an offshore oil production platform, FIG. 14 is an elevation of an underwater wellhead, FIG. 15 is an elevation of an offshore pivoting tower, FIG. 16 is a sectional elevation of a ball and socket joint used in the tower of FIG. 13, FIG. 17 is a diagram illustrating a method of installing an underwater pipeline.

The ball and socket pipe coupling of FIGS. 1 to 4 comprises a member 1, which has a through-bore, which is connected at one end to a first pipe 23, and which has a spherical enlarged portion at its other end with forward and rear facing spherical surface portions 2 and 3 respectively. A collar comprising two ring-shaped parts 4 and 5 is engaged about the member 1. The collar comprises a spherical internal surface portion formed by the internal surface of its part 4, which is mated with the forward spherical surface portion 2 of the member 3, and a spherical internal surface portion, formed by the internal surface of its part 5, which is mated with the rear spherical surface portion 3 of the member 1. The two ring-shaped parts 4 and 5 are connected together by a plurality of screws 6. The front portion of the forward part 4 of the collar has a frusto-conical outer surface 7, while the rear part 5 of the collar has a cylindrical outer surface. The rear portion of the forward part 4 of the collar has a surface which is smoothly curved in the axial direction, the curve being tangential to the surface of the rear part 5 of the collar and merging into the frusto-conical surface portion of the forward collar part 4. Two sealing rings 9 made of resiliently deformable material are arranged in annular grooves in the internal surface of the collar so that they are interposed between the rear surface 3 of the enlarged portion of the member 1 and the rear part 5 of the collar.

A socket 10, connected at one end to a second pipe 24, comprises a flange 11 at the opposite end. The flange 11 has in it a plurality of radial bores or cylinders wherein there are piston-driven wedge members 12 which are sealed for hydraulic actuation by seals 13 and 14. Screwed plugs 15 close the ends of the cylinders with sealing washers 16. The radial configuration of the bores and wedge members 12 is shown best in FIG. 2. To assemble the ball and socket joint, the two parts 4 and 5 of the collar are first engaged about the member 1 and the screws 6 tightened so that the spherical internal surface portions of the collar are slidingly engaged with the spherical surface portions 2 and 3 of the member 1. This ensures that the collar is maintained about the member 1 but the member and collar can swivel relatively to one another. Where the coupling is used for an underwater pipeline, the collar is engaged about the member 1, and the member 1 and socket 10 are fixed to the respective lengths of pipe to be joined, before the pipe lengths are immersed. The pipe lengths are then lowered to the bottom, i.e. to the sea bed or the like, and then the collar and member 1 are entered into the socket 10.

When the collar and member 1 have been fully entered into the socket 10, pressurised fluid is applied through the inlet 17 to cause movement of the wedge members 12 radially inwards. During such movement the wedge faces 19 of the member 12 engage the collar and force it further into the socket 10. After the collar and member 1 have been pushed into the socket 10 as far as they can go, further radial inward movement of the members 12 results in there being applied to the collar a forward preloading force which counteracts the separation force, due to pressure of the fluid flowing in the pipeline, tending to push the collar and member 1 out of the socket 10.

Pressurised fluid can be applied through inlet 18 to return the wedge members 12 to their outer positions which allows disengagement of the member 1 and the socket 10. The tapered wedge faces 19 of the wedge members 12 and the correspondingly inclined rear face of the collar against which the wedge faces 19 engage, have an angle to the direction of movement of the members 12 of about 5° so as to give a ratio between the distance moved by the wedge members 12 while they are in engagement with the collar to the distance moved by the collar as a result of such movement of the wedge members of about 10:1. As a general case, this ratio should preferably be less than 2:1 or, better still, less than 5:1.

Sealing between the external cylindrical surface of the rear part 5 of the collar and the internal surface of the flanged part of the socket 10 is effected by two parallel annular seals 8 disposed in grooves 21 formed in the internal surface of the socket 10. A groove 22c is formed in the inner surface of the part 5 of the collar between the two seals 9 and a groove 22d is formed in the inner surface of the socket 10 between the two seals 8. The two grooves are interconnected by a hole 22a and are connected to a pressure inlet port 20 by way of a hole 22b. By applying pressure to the port 20, the sealing effect of the seals 8 and 9 can be tested.

The frusto-conical surface portion 7 of the forward part 4 of the collar mates with a correspondingly shaped internal surface of the socket 10. Ring seals 25 are arranged in grooves in the inner and outer surfaces of the part 4 to provide sealing between this part and the member 1 and the socket 10.

The angle to the socket axis, i.e. the direction in which the collar is pushed by the force applied thereto by the wedge members 12, of the internal surface portion of the socket 10 which mates with the frusto-conical surface portion 7 of the part 4 of the collar is sufficiently small for the force with which the frusto-conical surface portion 7 is pushed against the mating surface portion of the socket 10 to be redirected to become a radially inward force acting on the part 4 of the collar with an amplification of about 2.5 times, i.e. if the collar is pushed forwards by the wedge members 12 with a force of about 100 tons then the resulting radially inward force on the part 4 of the collar is about 250 tons.

The forward force exerted by the wedge members 12 can be made sufficiently great to give a metal to metal seal at the mating surfaces of the collar and socket, and of the collar and the member 1, i.e. so that the function of the ring seals 25 and 9 is then solely to seal any possible imperfections such as score marks in the mating surfaces and not to bridge large gaps between those surfaces, the main sealing effect being provided by the metal to metal contact. To facilitate this, all the mating surfaces are given a 32 micro-inch or better surface finish. It may be better to give these mating surfaces a 16 micro-inch, or even an 8 micro-inch surface finish. The forward force should in any case be at least somewhere around one half of the estimated axial separation force which will be exerted by the fluid flowing under pressure in the pipeline, which separation force tends to push the member 1 out of the socket 10. The pressure of the fluid in the pipeline will also tend to expand the member 1, the collar and the socket 10, and there is also a radial component of the separation force due to the wedge action of the rear spherical surface of the member. The collar can contain a tensile hoop stress to counteract the radial forces but to further counteract it and also to counteract the tendency for the socket 10 to expand radially, the flange 11 is dimensioned so that it has substantial strength and the cylindrical rear part 5 of the collar fits closely within the flange 11.

As shown in FIG. 4, owing to the shape of the front part 4 of the collar, the assembly of the collar and the member 1 can be entered into the socket 10 even when the axis of the member and/or the axis of the collar are not in alignment with the axis of the socket. The axis of the member 1 can be say 10° and of alignment with the axis of the socket and the collar can then be a maximum of about 20° out of alignment with the axis of the socket.

The two parts 4 and 5 of the collar are relatively located in a plane perpendicular to the collar axis by an annular rearwardly directed extension 4a of the part 4 having the front portion 5a of the part 5 spigoted into it with a transition fit i.e. a fit roughly within the range from a location fit to a light interference fit. As an alternative (not shown) to this means of relatively locating the two parts 4 and 5, at least two of the screws 6 by which the two parts are connected together can be a transition fit within their respective bores.

The magnitude of the aforementioned axial component of the separation force due to the pressure of the fluid in the pipeline can be calculated by multiplying the pressure of the piped fluid and the cross-sectional area over which it acts to produce the axial component. This area is roughly equal to the area enclosed by the outer diameter of the seal 25 disposed between the surface portion 7 of the collar and the mating surface of the socket 10. By way of example, the component may have a magnitude of around 1000 tons in a 36 inches oil pipeline operating at a pressure of 2000 P.S.I. The tendency to separation of the member and socket in the axial direction is counteracted by forces transmitted through the points or areas of contact between the member 1 and the rear part 5 of the collar, between the rear part 5 and the wedge members 12, and between the wedge members 12 and the flange 11 of the socket 10. The coupling is constructed so that these areas of contact, or at least the extremities thereof which are nearest the axis of the collar, are kept close together so that, as far as possible, the forces transmitted through them are entirely shear, tensile or compressive forces, i.e. so that none of the force transmitting parts is acted upon by two opposing forces which are substantially spaced apart in the direction perpendicular to the directions in which the forces act to cause bending. This is obtained, in FIG. 1, by the collar having a relatively small wall thickness, i.e. the difference between the radii of the inner and outer surfaces of the collar is relatively small, by the fact that the area of contact between each wedge member 12 and the rear face of the collar part 5 is, at least at its nearest extremity to the collar axis, at a distance from the collar axis which is no greater or at least not much greater than the radius of the member 1, i.e. one half the maximum transverse dimension of the member 1, and the inner extremity of the area of contact between each wedge member 12 and that part of the flange which is behind each wedge member 12 is also at a distance from the axis of the collar which is not much greater than the radius of the member 1. All these points of contact are at a distance from the collar axis which is no greater than 20% more than the radius of the member. It is even better if the distance is less than 10% more than the radius of the member. By the above-described means, axial deflection is minimised. The axial separation force generates a radial component due to the wedge action of the rear spherical surface of the member and any tendency for the socket to "bell-out" is minimised by the tensile hoop stresses in the rear part of the collar and the substantial flange 11.

It will be seen that the two parts 4 and 5 of the collar have a gap between them when they are assembled together on the member 1. Owing to this gap, when the collar and member are entered into the socket and the wedge members 12 are moved inwards, the force applied by the wedge members squeezes the two parts of the collar together thereby clamping the member 1 within the collar and providing a rigidly coupled pipeline.

The pipe coupling of FIGS. 5 and 6 is similar to the one shown in FIGS. 1 to 4 except as follows. The forward part 4 of the collar is reduced in length and has the function only of holding the collar onto the member 1 before the member and collar are entered into the socket 10. The part 4 has an axially curved front surface to ease entry of the collar into the socket but this surface does not mate with a corresponding internal surface of the socket. Instead, the socket is provided with an internal surface 10a which mates with the forward spherical surface portion 2 of the member 1. A sealing ring 10b is disposed in an annular groove formed in the surface 10a to provide sealing between the member and the socket.

Sealing between the rear part 5 of the collar and the socket is provided by ring seals 8 disposed in grooves in the external surface of the part 5 (instead of in the internal surface of the socket as in the embodiment of FIGS. 1 to 4). The seal testing groove 22d is formed in the external surface of the collar part 5 between the ring seals 8. The seals 14 are mounted in grooves formed in the wedge members 12 instead of, as in FIG. 1, in grooves formed in the walls of the bores in the flange 11.

The collar comprises a main body consisting of connected together first and second ring-shaped parts 4 and 5, and a third ring-shaped part or annulus 5b which is connected to the rear of the main body by screws 5c to form the rear surface of the collar. Between the annulus 5b and the part 5 of the collar, there are interposed packing pieces 5d which enable the distance from the part 5 of the annulus 5b to be adjusted and hence for the overall length of the collar to be adjusted. Even if no packing pieces are present, it is still useful to have the collar formed by a main body and an annulus such as 5b because the annulus can be readily removed from the main body and machined to a desired axial length to give a desired length of the collar, such machining not requiring the more expensive and larger main body, or rear ring shaped part 5 of the collar, to be handled for turning or grinding to final overall length adjustment.

The screwed plugs 15 of FIGS. 1 to 4 are replaced by flanged, unscrewed plugs 15a each secured in place by a plurality of screws 15d and sealed with respect to the inner surface 15b of the respective cylinder by a ring seal 15c.

As with the first embodiment, to join two lengths of offshore pipe 23 and 24 by means of a coupling according to FIGS. 5 and 6, the member 1 and the socket 10 are welded to the lengths 23 and 24 as shown, and the collar is engaged about the member 1, the two parts of the collar having butting faces to maintain the collar in sliding engagement with the member 1. Then the pipelengths are lowered to the sea-bed and then the pipelengths are moved so that the collar and member enter the socket 10, the two pipelengths and the socket and collar not having to be axially aligned to enable this to occur. Then fluid pressure is applied to the union 17 to drive in the wedge members 12. These wedge members then engage the collar and push it forwards into the socket, thus securing it inside the socket. The member becomes clamped between that surface of the socket 10 which mates with the forward surface 2 of the member, and the internal surface of the collar part 5.

Thereafter, the wedge members 12 may be locked in position, for example by filling up the cylinders in the flange 11 with liquid epoxy resin, which is then made or allowed to set.

To ease assembly of the joint the external curved surface of the collar, the rear surface of the collar which engages the wedge members (i,e. the rear surface of the part 5 of FIG. 1 or the ring 5b in FIGS. 5 and 6) and the mating faces of the wedge members 12 may be greased with molybdenum disulphide grease. These surfaces, and the surfaces of the wedge members 12 which are in sliding engagement with the interiors of the bores in the flange 11, could during manufacture of the joint be given a phosphate surface finish and then be impregnated with molybdenum disulphide.

The couplings described so far are intended for use in situations where conventional flanges would prove extremely difficult or impossible to connect. These conditions exist during the installation and repair of deep underwater pipelines where divers have limited visibility and are only able to perform light tasks, or beyond diver depth where small submarines or remotely controlled manipulators must be used. The hydraulically operated wedging members 12, constituting as they do a remote or non-manually actuated means for securing the parts of the coupling together, are especially suitable for such difficult working environments. Other remotely or non-manually operated securing means (not shown) could be provided, for example screw operated wedge means which is operated at a single point, i.e. by turning a single screw or shaft. For less difficult working environments various other securing means can be provided, for example as comprised in the embodiment of FIGS. 7 and 8. The embodiment of FIGS. 7 and 8 comprises a member 161 similar to the member 1 of FIG. 1, i.e. it has an enlarged spherical end with forward and rear facing spherical surface portions. The other end of the member 161 is connected to a first pipe 162, and a collar comprising first and second ring-shaped parts 163 and 164 is engaged about member 161. The two ring-shaped parts are connected by a plurality of screws 165. The member 161 with the collar engaged thereon has been entered into a socket 168. The collar of this embodiment is similar to the collar comprised in the embodiment of FIGS. 1 to 4 except that, here, no sealing rings are arranged to provide sealing between the rear part 164 of the collar and the socket 168 and member 161. In addition, the rear part 164 is partially segmented as will be described later. Four sealing rings 166 are arranged in annular grooves in the front part 163 of the collar, two in the external surface of the part 163 to provide sealing between this part and the socket, and two in the internal surface of the part 163 to provide sealing between the part 163 and the member 161. These seals may be pressure tested by the application of pressure through a hole 167 in the socket 168, and an interconnecting hole 169 in the collar.

One end of the socket 168 is attached to a second pipe 170 while its other end 168a has a plurality of axially extending, screw-threaded bores formed therein. Engaged in these bores are a plurality of screwed studs 171. The collar has a third ring-shaped part or flange 172 at its rear end, and this flange has holes in it, in which holes the studs 171 are engaged. Nuts 173 are screwed onto the free ends of the studs and tightened on to the flange 172 to provide the required amount of axial pre-loading force on the collar. The flange 172 is attached to the rear part 164 of the collar by screws 174. In addition, the flange is located with respect to the part 164 by means of an annular spigot 172a which extends axially from the inner edge of the front face of the flange into a corresponding recess at the inner edge of the rear face of the part 164, whereby the flange 172 does not substantially restrict expansion of the part 164 and hence closure of any clearance between the part 164 and the inner surface of the end 168a of the socket 168.

The rear part 164 of the collar is partially segmented, that is to say it has in it a plurality of radial slots 175 which extend forwardly from the rear end of the part 164 forwardly to a point near the front end of this part, where it is spigoted into the part 163, but not right through the length of the part 164 so that there remains a portion at the front of the part 164 by which the segments are joined together. The function of the segmenting is to reduce the resistance to expansion of the part 164, i.e. to make it more easy for the part 164 to expand, due to the axial pre-loading force in conjunction with the wedging action of the rear spherical surface portion of the member 161, so as to close any clearance between the part 164 and the internal surface of the end 168a of the socket 168, while not reducing to any substantial degree the ability of the part 164 to withstand compression across the wall of this part, i.e. so that the part 164 can easily expand into contact with the inner surface of the socket 168 but so that, once this expansion has occurred further radially outward forces acting on the inner surface of the part 164 are transmitted to the inner surface of the socket 168 without the wall of the part 164 being distorted or "squashed" to any substantial degree. As can be seen the wall thickness at the end 168a of the socket 168 is relatively great not only so as to enable the screw-threaded bores for the studs 171 to be formed therein but also so as to provide the radial force withstanding function which, in the embodiment of FIGS. 1 to 6, is provided by the flanges 11.

Instead of being only partially segmented, the rear part 164 of the collar could be entirely segmented, i.e. it could comprise entirely separate metallic segments, or it could comprise separate metallic segment integral to a bonded rubber assembly to form a ring which is radially deformable but which is relatively incompressible to forces applied to the ring cross-section. By way of example, such a ring could be constructed in a manner similar to that used for the packing units in the "GL" annular blow out preventers marketed by the HYDRIL Company.

It will be appreciated that the collars in the embodiments of FIGS. 1 to 6 could also be constructed in the ways described for FIGS. 7 and 8. Instead of the screw-threaded studs 171 and nuts 173 connecting the end 168a of the socket 168 and the flange 172 in the embodiment of FIGS. 7 and 8, the end 168a could be formed as a flange (as in the embodiments of FIGS. 1 to 6) and then this flange and the flange 172 could be connected together by means of a segmented ring clamp comprising two annular walls which extend radially inwards towards the clamp axis, the segments of the clamp being able to be drawn together so as to reduce the diameter of the clamp with the flanges of the socket and collar between the two annular walls. In order to give the preloading force which tends to push the collar forwards into the socket, the internal surfaces of the annular walls of the ring clamp and/or the outer faces of the flanges can be so inclined that as the diameter of the clamp is reduced the two flanges are forced towards one another.

In all the embodiments described, the clamping of the member may be able to be assisted by roughening the internal surface of the collar, for example by knurling this surface, or by providing this surface with annular teeth (not shown). Also or alternatively, for low pressure rating the internal surface of the collar could be defined by material, for example an elastomer or plastic, which is more easily deformable than the material of which the member is made, for example the whole of the collar, apart from a harder ring shaped part in contact with wedge members 12, could be made of such more easily deformable material or it could have an internal lining of such material.

The mating surfaces between the collar and member, and/or the collar and socket, and/or the member and socket can be provided with means (not shown) for enabling fluid, such as grease which may be put into the surfaces to facilitate assembly, to flow out from between each pair of mating surfaces. Such means can comprise a series of interconnected axial and annular grooves formed in one of each pair of mating surfaces. These grooves should not of course break into any ring seal containing grooves in the mating surfaces but should be such as to leave a land on each side of the seal.

The described couplings may be for use with pipelines having diameters in the range from 1½ to over 36 inches. The connectors for large diameter pipelines weigh many tons and must be assisted into mating engagement, using firstly an underwater crane to bring the parts into close proximity, and secondly a jacking system to pull or push the ball coupling member into the socket coupling member.

FIG. 9 shows a pipe connector after the socket 31 and the collar and ball assembly 32 have been brought into close proximity. The socket flange 33 will be integral with the socket 31 if radial piston actuated wedge members are incorporated and the flange 34 is integral to a short length of pipe welded between the pipeline 35 and the ball-shaped coupling member of the assembly 32. As shown in FIG. 10, a first horseshoe-shaped frame 36 carrying hydraulic jacks 37 is positioned over the flange 33 and a second horseshoe-shaped frame 38 is positioned over the flange 34. The jacks 37 are extended as required to connect with frame 38, and provided that the ball-shaped coupling member has partially entered the socket coupling member 31, the rams are pressurised for return in order to pull the coupling members firmly together. After securing the ball in the socket, the frames and jacks are removed, and may be used in reverse if disconnection is necessary later.

Examples of uses of the connector are shown in FIGS. 11 to 16.

When used to repair a damaged pipeline, see FIG. 11, the ball and socket connector 42 should be used in conjunction with a sleeve connector 43, able to grip the cut end of the pipeline 44 after the damaged section has been removed. One such device is known commercially as the Hydrocouple, marketed by Hydrotech International, Inc.

In FIGS. 12 and 13, a pipeline 51 is connected to a platform riser 52 by means of two short lengths of pipe or spool pieces 53 and 54, and three ball and socket connectors 55, 56 and 57. When making a connection of this type with conventional flange connections, the lengths of the spools, and the angular relationship of pipeline 51 to platform riser 52 must be precisely controlled. The precision required becomes much less critical when using ball and socket connectors due to the accommodation of angular misalignment; with two spools positioned at right angles, considerable inaccuracy in spool lengths can be tolerated. If connectors 55 and 57 are loosely joined, then spools 53 and 54 may be pivoted about 55 and 57 to allow connector 56 to be joined without inducing any pipe bending stresses, provided the angular deviations required are not outside the limits of free movement.

When making a connection as shown in FIGS. 12 and 13, socket coupling members may be attached to the platform riser 52 and to the pipeline 51. Spool pieces can be fabricated to span the remaining perpendicular distances, and the ball ended coupling members of connectors 55 and 57 can be inserted into their respective socket members on the sea-bed. Seals 8 and 9 (as shown in FIG. 5 i.e. arranged in grooves in the joint collar) may then be tested by pressurising port 20, and if found unsatisfactory, the collar can be raised to the surface for inspection and/or replacement of the seals.

FIG. 14 shows a similar two spool connection between an underwater wellhead 61 and a flowline 62. An example of the use of the connector in a situation requiring free angular movement is shown in FIG. 15. The tower 71 may be a drilling platform, single point mooring, or a flare stack, and is attached by a ball and socket joint 72 to a base 73 which was positioned firmly on the sea-bed before arrival of the tower 71. The tower 71 and base 73 may be connected and disconnected with ease. The joint 72 comprises (see FIG. 16) a spherically-shaped member 74 fixed to the base of the tower 71, which member is surrounded by the two parts 75 and 76 of a collar, the two parts being spigoted together but there being no gap between the parts to allow relative movement thereof towards each other. The internal spherical surfaces of the collar may be treated to provide good bearing properties, or the collar may be fabricated from a material having good bearing characteristics. The initial running clearance between the collar and ball is maintained to allow free pivoting movement, but the bearing load, which may be up or down depending on tower buoyancy, will cause local surface contact on the upper and lower part of the collar. Wedge members 77 are arranged circumferentially about the socket 78, and may be moved radially to allow engagement or disengagement of the collar.

The ball and socket joint 72 is just that — not a pipe coupling as in FIGS. 1 to 8. However, as an alternative (not shown), there could be provided through bores in the member 74 and socket 78, and seals could be added, so as to form a passage for fluids to flow through.

When installing flowlines of 4 to 20 inches diameter between submarine weelheads/manifold centres/platforms, the conventional lay-barge or reel barge methods may be uneconomical for short lengths of say 1000 to 12000 feet. Another method under investigation, consists of prefabricating the length of pipe, towing it suspended on buoys below surface, and hauling it down using flotation control. This method also has disadvantages.

In an embodiment of a pipeline laying method according to the invention, a relatively small dynamically-positioned vessel is used to install short lengths of up to about 500 feet, say 100 to 200 feet for preference, and connectors, in accordance with the invention, preferably ones in accordance with FIGS. 1 to 4 or FIGS. 5 and 6 of the accompanying drawings, are used to join the lengths together. The socket and the ball member/collar assembly of each coupling are welded to the ends of the two pipe-lengths to be joined before they are submersed, e.g. on the vessel, then the lengths are laid and joined together on bottom (i.e. on the sea-bed) by divers or remotely-controlled manipulators. This method of construction would be very difficult if conventional welded or flange couplings were used, but is much easier when connectors such as those described herein are used.

FIG. 17 shows a vessel 81 on the sea surface with davits 82 arranged along the side for synchronous operation to lower a length of pipe 83, having a ball coupling member 84 and a socket coupling member 83 welded at each end, down to the sea-bed. Divers from the diving bell 86 can then make the connection to the already installed series of lengths of pipe 87.

The pipe-laying operation could be performed completely underwater if a number of pipe lengths were carried by a submersible vehicle having pipe handling manipulators and diver "lock-out" facilities. This technique would be particularly suitable for laying pipelines under ice floes.

A cable tensioned between the two points to be connected prior to laying operations would serve as a useful directional guide.

I claim:

1. A ball and socket joint for connecting two pipe ends, the joint comprising:
    two coupling members each of which is attached at one end thereof to a respective one of said pipe ends;
    one of said two coupling members having, at the other end thereof, a radially enlarged portion defining concentric forward and rearward facing spherical outer surface portions;
    a collar which is disposed around said one of said two coupling members and which comprises first and second ring-shaped parts and means for holding the ring-shaped parts against separation, said first ring-shaped part having a spherical internal surface portion in mating engagement with said forward facing spherical outer surface portion of said radially enlarged portion of said one coupling member, and said second ring-shaped part having a spherical internal surface portion in mating engagement with said rearward facing spherical outer surface portion of said radially enlarged portion, the collar being arranged, at least initially, for swivelling movement relative to said radially enlarged portion,
    the other of said two coupling members having, at the other end thereof, a socket for receiving the said radially enlarged portion and said collar therein,
    securing means comprising at least one abutment member supported by said socket for radial movement with respect to said socket, the abutment member being movable between a radially outward first position, enabling free insertion and removal of said radially enlarged portion and said collar into and from said socket, and a radially inward second position in which the abutment member engages said collar for maintaining it within the socket; and
    drive means coupled to the abutment member for driving said abutment member between said inward and outward positions.

2. A joint according to claim 1, including locating means for preventing movement of one of said first and second ring-shaped parts with respect to the other in a plane perpendicular to the axis of the collar.

3. A joint according to claim 1, wherein at least a portion of the collar adjoining the front thereof has an external surface which becomes smaller in diameter proceeding towards the front of the collar.

4. A joint according to claim 1, wherein said securing means comprises a plurality of abutment members distributed around the circumference of said socket, and said drive means is operable for moving the abutment members radially between respective first, disengaged positions in which the abutment members are radially outwards of the collar and respective second positions in which the abutment members engage said collar.

5. A joint according to claim 1, wherein said first and second ring-shaped parts have edge surfaces defining a gap between the two ring-shaped parts, and wherein said securing means and said drive means are operable for applying and maintaining a sufficiently large axial compressive force to a rearward surface of said second ring-shaped part to maintain a compressive stress in said first ring-shaped part in opposition to pipeline internal pressure generated forces tending to push said radially enlarged portion out of said socket, thereby continuously clamping said radially enlarged portion between the two ring-shaped parts.

6. A joint according to claim 5, including first seal means interposed between said collar and said socket to effect fluid sealing therebetween and second seal means interposed between said collar and said radially enlarged portion to effect fluid sealing therebetween.

7. A joint according to claim 1, wherein said socket has a spherical internal surface portion in mating engagement with said forward facing spherical outer surface portion of said radially enlarged portion.

8. A joint according to claim 7, including seal means interposed between said spherical internal surface portion of said socket and said forward facing spherical outer surface portion of said radially enlarged portion to effect fluid sealing therebetween.

9. A joint according to claim 1, wherein the said second ring-shaped part has a series of radially extending slots formed therein to reduce the resistance of the part to radial expansion.

10. A joint according to claim 1, wherein said abutment member comprises a tapered wedging face for engaging a rearward mating surface of said collar to apply to the collar a predominantly forwardly directed axial force.

11. Apparatus forming an assembled ball and socket joint between two pipe ends comprising:
   a coupling member attached at one end to one of said pipe ends, and having a radially enlarged portion, with concentric forward and rear facing spherical outer surface portions, at the other end;
   a first ring-shaped part having a spherical internal surface mating with said forward facing spherical surface portion of the said radially enlarged portion of the coupling member;
   a second ring-shaped part having a spherical internal surface mating with said rear facing spherical surface portion of the said radially enlarged portion;
   first attachment means to maintain the first and second ring-shaped parts in assembled relationship for at least initial sliding engagement with said member;
   a third ring-shaped part at least near to a rear facing surface of the second ring-shaped part;
   second attachment means to maintain the second and third ring-shaped parts in assembled relationship;
   a socket which is attached at one end to the other of said pipe ends and which is adapted for receiving therein at least said first and second ring-shaped parts and said radially enlarged portion, and
   force applying means connected to the socket for applying and maintaining an axial compressive force to a rearward facing surface of said third ring-shaped part, to thereby hold said first and second ring-shaped parts and said radially enlarged portion in said socket.

12. Apparatus according to claim 1, wherein said first and second ring-shaped parts have edge surfaces defining a gap therebetween such that the application of said axial compressive force to said third ring-shaped part clamps said radially enlarged portion of said coupling member between the first and second ring-shaped parts.

13. Apparatus according to claim 11, wherein said socket has a spherical internal surface portion in mating engagement with said forward facing spherical surface portion of the said radially enlarged portion whereby the said radially enlarged portion is clamped between said second ring-shaped part and said socket upon application of said axial compressive force to said third ring-shaped part.

14. Apparatus according to claim 11 including locating means for preventing relative movement of said ring-shaped parts in a plane perpendicular to the common axis thereof.

15. Apparatus according to claim 11, wherein at least a portion of said first ring-shaped part adjoining the front thereof has an external surface which becomes smaller in diameter proceeding towards the front of the first ring-shaped part.

16. Apparatus according to claim 11 wherein said second ring-shaped part is at least partially segmented to reduce the resistance of the part to radial expansion.

17. Apparatus according to claim 11, wherein said socket comprises an outwardly extending, annular flange at the open end thereof and wherein said force applying means comprises a plurality of screw-threaded studs extending between said annular flange and said third ring-shaped part and nuts screwed onto the respective studs.

18. A ball and socket joint for connecting two pipe ends, the joint comprising:
   two coupling members each of which is attached at one end thereof to a respective one of said pipe ends;
   one of said two coupling members having, at the other end thereof, a radially enlarged portion defining concentric forward and rearward facing spherical outer surface portions;
   a collar which is disposed around said one of said two coupling members and which has a first spherical internal surface portion in mating engagement with said forward facing spherical outer surface portion of said radially enlarged portion of said one coupling member, and a second spherical internal surface portion in mating engagement with said rearward facing spherical outer surface portion of said radially enlarged portion, the collar being arranged, at least initially, for swivelling movement relative to said radially enlarged portion, and the collar further comprising means for adjusting the axial length of the collar,
   the other of said two coupling members having, at the other end thereof, a socket for receiving the said one coupling member and said collar therein,
   securing means comprising at least one abutment member supported by said socket for radial movement with respect to said socket, the abutment member being movable between a radially outward first position, enabling free insertion and removal of said one coupling member and said collar into and from said socket, and a radially inward second position in which the abutment member engages said collar for maintaining it within the socket; and
   drive means coupled to the abutment member for driving said abutment member between said inward and outward positions.

* * * * *